United States Patent [19]

Condrey

[11] Patent Number: 5,017,076

[45] Date of Patent: May 21, 1991

[54] SYSTEM FOR HANDLING COTTON MODULES

[76] Inventor: Tommy Condrey, 100 Graham St., Lake Providence, La. 71254

[21] Appl. No.: 431,435

[22] Filed: Nov. 3, 1989

[51] Int. Cl.⁵ .......................................... B65G 67/24
[52] U.S. Cl. .................................. 414/345; 414/352; 414/376; 414/389; 414/786; 446/424; 104/29
[58] Field of Search ............... 414/338, 340, 343, 345, 414/349–353, 373, 376, 389, 786; 104/27, 29; 19/64.5, 65 A, 65 R, 80 R; 446/424, 427

[56] References Cited

U.S. PATENT DOCUMENTS

| | | | |
|---|---|---|---|
| 302,297 | 7/1884 | Swinnie | 19/64.5 |
| 784,465 | 3/1905 | Anderson | 414/340 X |
| 1,117,777 | 11/1914 | Brown | 414/340 X |
| 1,463,558 | 7/1923 | Sibley | 104/29 |
| 1,581,745 | 4/1926 | Kellett | 414/373 |
| 1,835,133 | 12/1931 | Bergen, Jr. | 414/340 X |
| 2,086,799 | 7/1937 | Gribble | 104/29 |
| 2,855,115 | 10/1958 | Casey, III | 414/373 |
| 3,889,603 | 6/1975 | Harada | 104/29 X |
| 4,065,006 | 12/1977 | Barry | 414/338 X |
| 4,109,875 | 8/1978 | Condarco et al. | 19/80 R X |
| 4,117,571 | 10/1978 | Prather | 19/80 R X |
| 4,417,841 | 11/1983 | Chadwick | 414/345 X |

Primary Examiner—David A. Bucci
Attorney, Agent, or Firm—Keaty & Keaty

[57] ABSTRACT

This invention relates to a system for conveying cotton from an unloading station to a gin house, while preventing the cotton from absorbing moisture from the ground. In accordance with the present invention, the system provides for the use of a network of railway tracks either directly from the field to a gin site or least at the gin mill, as well as the use of lightweight, flat, open bed carriers which run along the railway tracks, transporting cotton modules from one station to the other en route from the field to a gin house or storage facility.

9 Claims, 5 Drawing Sheets

SYSTEM FOR HANDLING COTTON MODULES

BACKGROUND OF THE INVENTION

The present invention relates to a system of handling cotton, which is loaded and transported to a gin and an apparatus therefore.

It has long been a problem in the related art to prevent cotton modules from absorbing moisture from the ground on which cotton modules are traditionally positioned for storage prior to their transportation to a cotton gin or prior to feeding into gin machines. The season of cotton harvesting is rather a short one and it is every farmer's goal to harvest as much cotton as possible at the time when inclement weather may prevent timely harvesting and transportation of cotton to a gin, wherein it can be processed. At the present time, the harvested cotton is compacted into modules by special equipment, module builders, with the modules being subsequently loaded onto a truck or a tractor trailer and transported to a gin. However, once at the gin, the cotton has to be unloaded and stored, since the gin operation may not permit processing of the delivered cotton modules just at that time. Since the modules are traditionally stored on the ground, there is always present a danger of the modules absorbing water, or other moisture from the ground, thereby substantially reducing the quality of the cotton and, therefore, its price.

Storing of the delivered cotton in a truck with a moving bed also becomes impractical, since the time for transporting the cotton from the field to a gin is very limited and the cost of operating of the special equipment prohibits usage of that truck for storage purposes.

Additionally, the gin machines have always been a major problem for a gin owner, since they often require maintenance and even repairs during the crucial time of cotton harvesting. When this occurs, the gin operation has to stop, which means additional storage time for the cotton without being processed.

All of these problems led to the development of the present invention which contemplates provision of a new cotton handling system to eliminate drawbacks of the prior art.

SUMMARY OF THE INVENTION

The present invention achieves its objects and overcomes shortcomings of the prior art in a simple and straightforward manner. The system of the present invention provides for the use of a network of railway tracks which connect unloading station(s) with a gin house, seed house and other facilities at the gin mill. The system provides for the use of open flat bed carriers or dollies which are supported by a plurality of wheels and adapted to run along the railway tracks, transporting the cotton modules from an unloading station, some with feeders/breakers, to the gin and to the storage area. To facilitate loading and unloading of the modules, the modules are, preferably, securely positioned and formed to rest on the flat bed carriers or dollies. An unloading station is provided with an inclined, or raised ramp on which a truck with a moving floor can be positioned, with its unloading end being on substantially the same vertical plane as an elevated end of the ramp. The ramp is positioned above a portion of the railway track, so as to allow positioning of the dolly underneath the ramp in the opening formed in the ramp. One end of the cotton module is moved to rest on the dolly, while the moving floor is activated, gradually pushing the cotton module loaded thereon away from the truck and pushing the dolly away from the unloading end until such time as the entire module is placed on the dolly or carrier. The dolly can then be moved along the tracks to its designated station, such as directly to a gin or, in case the gin is processing another load of cotton bales, under a temporary storage cover which is erected along at least a part of the railway tracks. The cover permits storage of the fiber modules on the carriers in end to end proximity to each other until such time as the gin is ready to process the cotton stored on the carriers. An additional unloading station is provided for receiving trailers which can be hauled by conventional tractors to the sight, the ramp also having an inclined upper surface, such that the trailer can unload its load of cotton modules directly onto the carrier or dollies directly on the railway tracks, thus considerably saving labor and time in transporting the cotton from the unloading station to the gin.

In this manner, the cotton is prevented from being deposited on the ground and from absorbing moisture from the ground which allows the various machinery to receive a considerably greater amount of cotton at the gin site, while the gin continuously processes the cotton. This also insures a higher quality of yield of the processed cotton for the farmer, thereby increasing profits to the farmer and to the gin operators.

It is, therefore, an object of the present invention to provide a system for conveying cotton from the field to a gin site, avoiding contact of cotton modules with the ground.

It is a further object of the present invention to provide a system which allows easy conveying of cotton unloaded from conventional transportation means, such as a tractor trailer or a truck at the gin site without great labor or cost.

It is still a further object of the present invention to provide an apparatus for conveying cotton modules and a method for conveying cotton modules from an unloading station to the gin house.

These and other objects of the present invention will be more apparent to those skilled in the art from the following description of the invention.

BRIEF DESCRIPTION OF THE DRAWINGS

Turning now to the drawings.

DETAILED DESCRIPTION OF THE PREFERRED EMBODIMENT

Reference will now be made to the drawings, wherein like parts are designated by like numerals, and wherein numeral 10 designates the overall system of cotton handling at a gin site.

Figure 1:
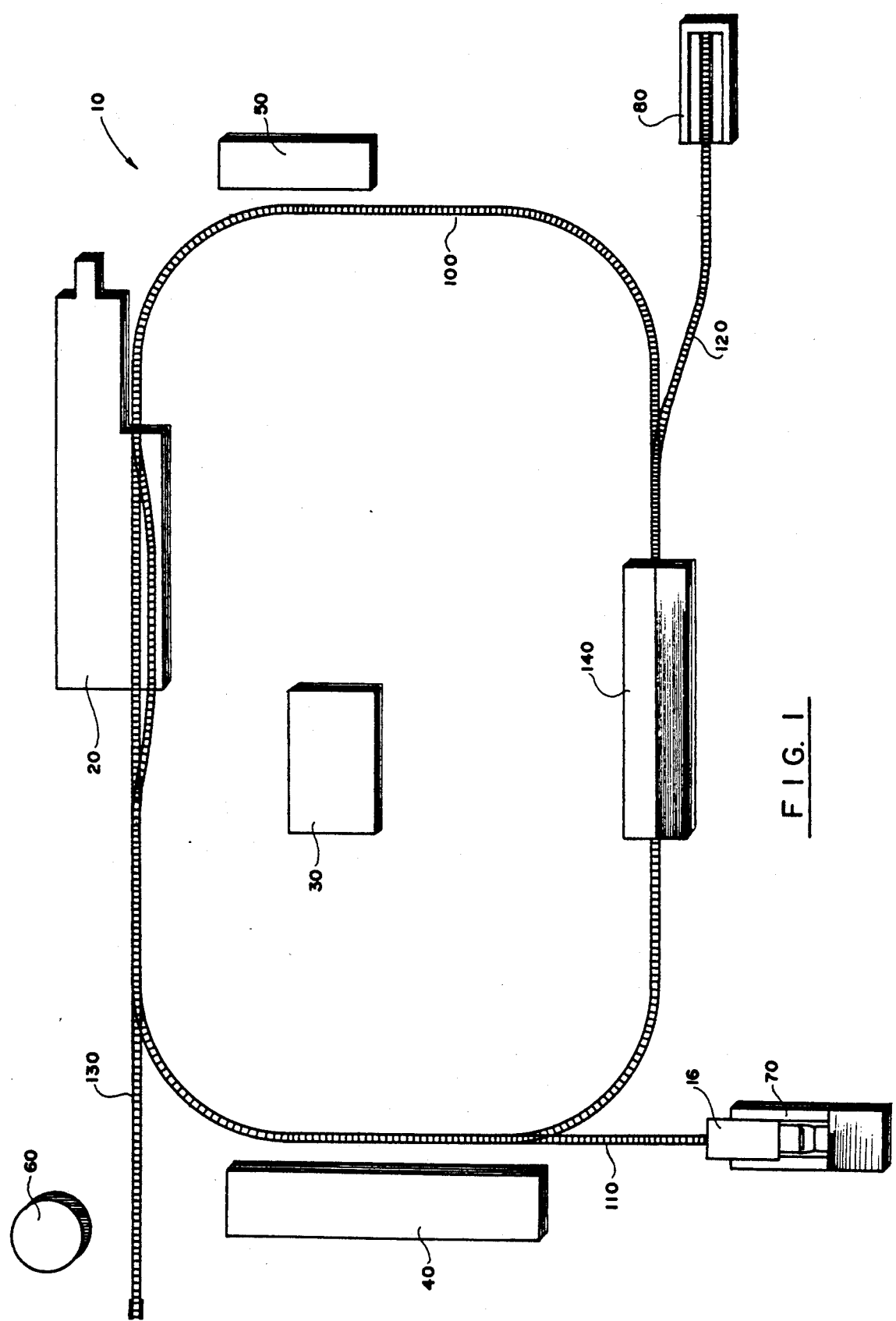
FIG. 1 is a schematic view of a gin mill, utilizing the system in accordance with the present invention.
Figure 2:
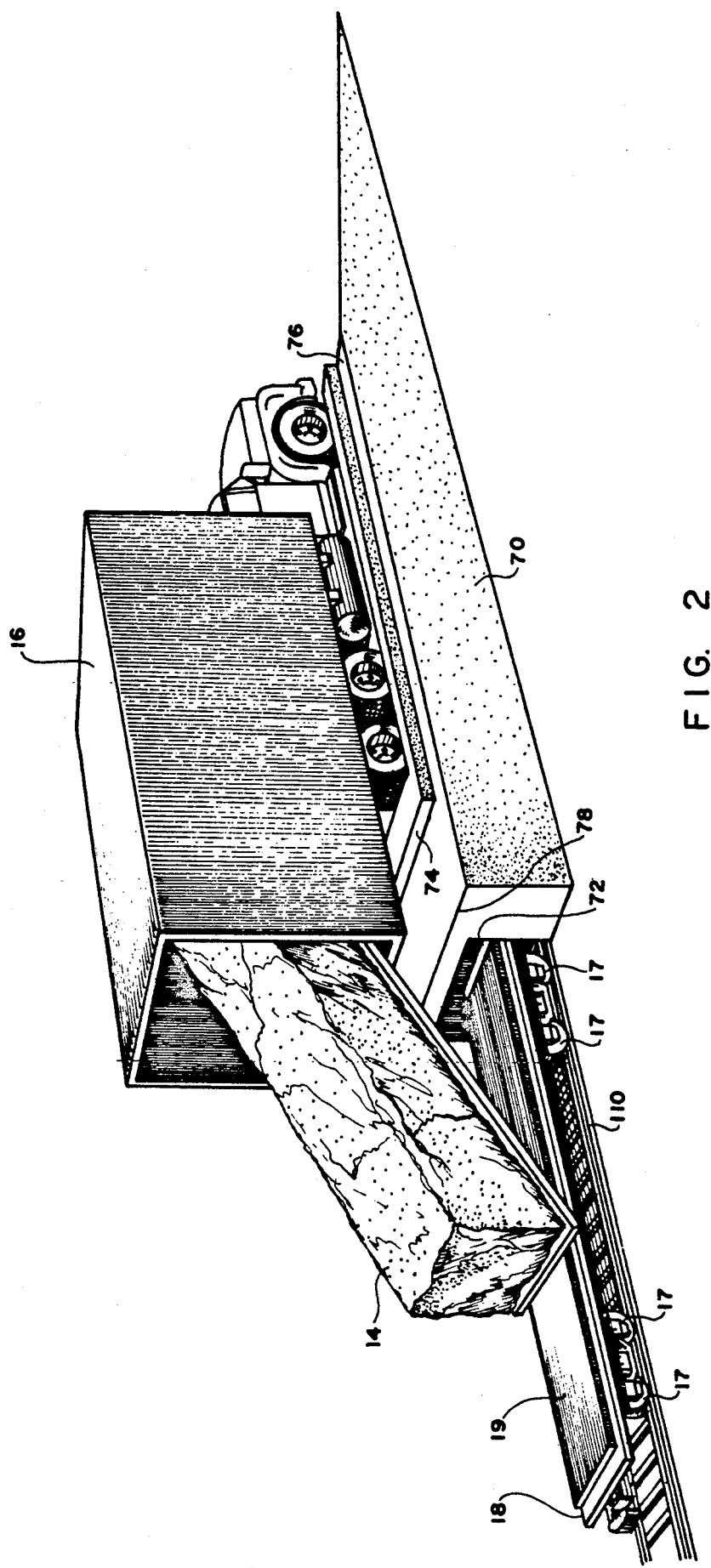
FIG. 2 is a detailed view illustrating unloading of a cotton module from a moving floor truck (or tilt bed truck) onto an open flat bed carrier or dolly.

As can be seen in FIG. 1, the gin mill traditionally contains a gin building 20, a module building 30, a trailer shed 40, a seed house 50 and a burner 60.

The present invention contemplates provision of a series of railway tracks, which connect the major facilities of a gin mill, such that a railway track passes by a gin house, trailer shed and seed house. Additionally, a number of railways lead to a special ramp 70 which is designed for use by heavy trucks which have a moving floor (or tilting beds) for unloading cotton modules. A still further track leads to a specially built ramp 80 which is designed for use by tractor trailers. Still, a further railway track is designed to deliver debris to a burner 60. The railway track in FIG. 1 is designated generally by numeral 100, with a line leading to the ramp 70 being designated as 110, the line leading to the ramp 80 being designated by numeral 120, with a line leading to the burner 60 designated by numeral 130. The track 100 is preferably lightweight, requiring relatively low cost investment and supplied with necessary control means (not shown) to direct transportation of module carriers along the tracks.

After the module of cotton has been built by conventional module builders, it is positioned/loaded onto a truck 16 which is provided with a moving/tilting floor allowing easy loading of the cotton module inside the truck.

Provided on the gin site is a cotton module carrier 18 which has a substantially flat top bed 19 and a plurality of wheels 17 which are adapted to run along the tracks 100. The cotton module carrier 18 is designed to allow any water or collected moisture to drain away from the cotton modules through screens (not shown), which are normally located at or near the edge of the carrier 18. A special ramp 70 is built over one end of the railroad track 110. The ramp 70 has an inclined upper surface, allowing the truck 16 to move along it and position itself at an elevated level above the track 110. One end of the platform 70 is formed with an opening 72, having the width substantially equal or slightly greater than the width of the track 110. The height of the opening 72 is slightly greater than the height of the wheeled module carrier 18. A barrier 74 on top of the upper surface 76 of the platform 70 prevents the truck 16 from moving closer to the unloading end 78, thus insuring a precise positioning of the truck 16 in relation to the track 110. A suitable barrier (not shown) is formed on the track 110 to prevent the carrier 18 from moving too deep into the opening 72 under the platform 70, thus also insuring precise positioning of the carrier 18 in relation to the platform 70.

Figure 5:
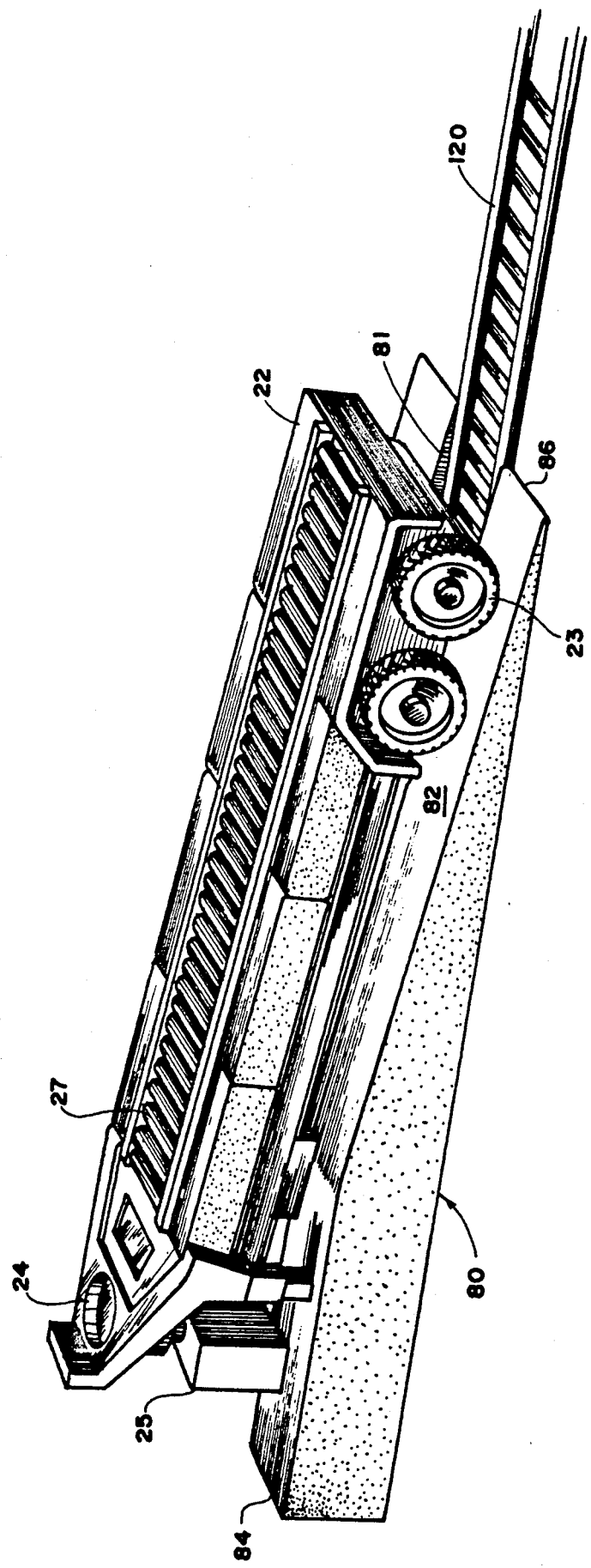
FIG. 5 illustrates a detailed view of a trailer for use in the system of the present invention which is adapted for hauling by a tractor directly from a farm.

Turning now to FIG. 5 the platform 80 is shown in more detail. As can be seen in the drawing, the platform 80 has an inclined upper surface 82 having an elevated end 84 and a low unloading end 86. The platform 80 is built with an opening 81 into which at least a part of the railway track 120 extends. The platform 80 is adapted for receiving a trailer 22 which can be hauled by a tractor or other farm equipment by conventional connecting means 24. The trailer 22 is provided, at one of its ends, with at least a pair of wheels 23 allowing hauling of the trailer 22 by the vehicle. An opposite end of the trailer 22 is provided with supports 25 (only one support 25 is shown in FIG. 5) on the ground or on a platform 80.

The top surface of the trailer 22 is provided with a plurality of rollers 27 which are mounted on individual axles in parallel relationship to each other, to allow rolling of the cotton module 14 from the trailer 22 onto a carrier 18, as will be described below.

Figure 3:
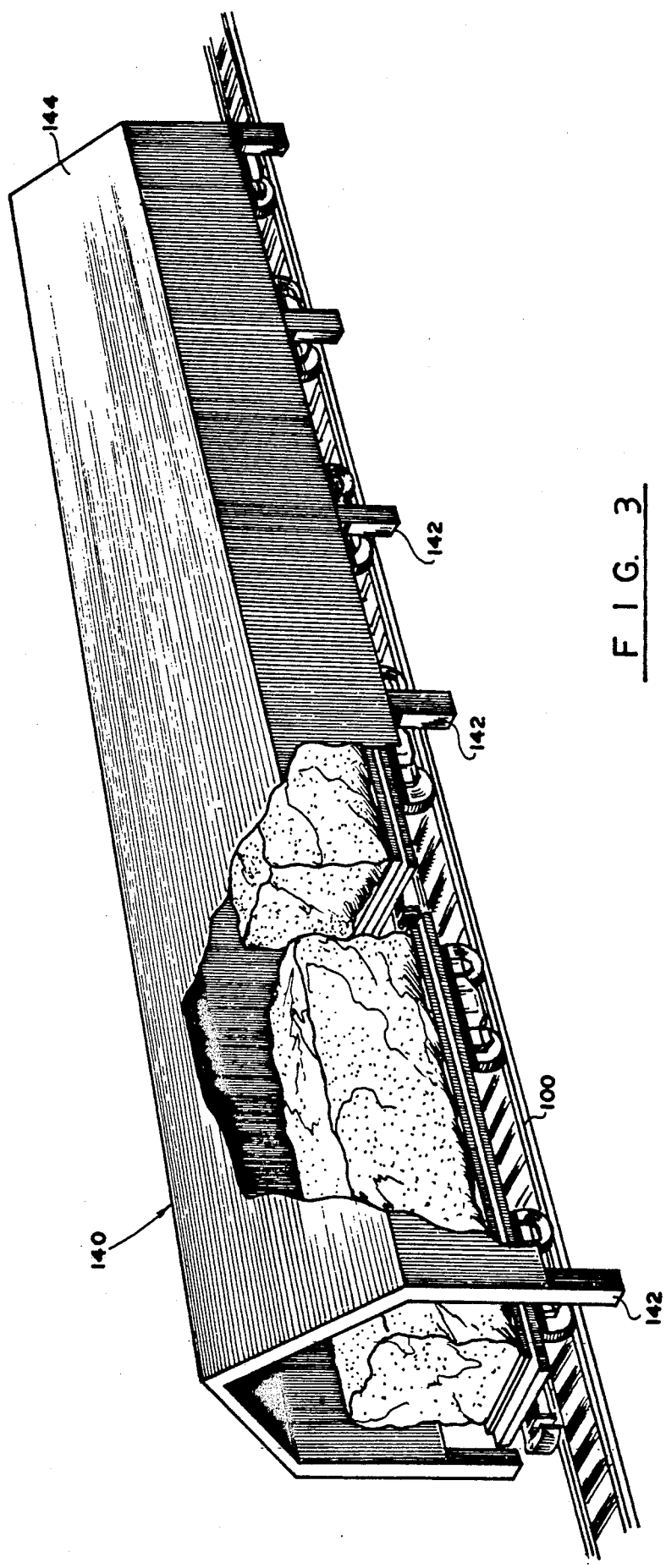
FIG. 3 illustrates a storage facility at a gin mill, allowing temporary storage of cotton modules under a shed.

Turning now to FIG. 3, a shed or carrier cover 140 is shown in more detail. As can be seen in the drawing, the shed 140 is built on support legs 142, horizontally spaced from each other and extending vertically from the ground, the supports 142 carrying a shed cover 144 which is high enough to allow free positioning and unobstructed movement of one or more carriers 18 on the railways 100.

The shed 140 can be made of any desired length, so as to protect from rain, a number of carriers 18 having cotton modules 14 loaded thereon. The shed 140 is only a temporary measure to store the cotton module before it is delivered to the gin for processing. The supports 142 are positioned to form a wide enough opening under the shed 140 to allow free movement of the carriers 18 along the tracks 100 to and from the shed 140. Such covers 140 can be built all around the gin site above the tracks 100, so as to allow full protection to the cotton modules delivered to the gin mill.

In operation, the cotton is picked up and deposited into a cotton module builder, so as to compress the cotton and form a plurality of cotton bales which are then positioned and loaded into a trailer 22 or into a truck 16 which is provided with a moving/tilting floor. The modules are then transported to a gin for processing. When the truck 16 comes to a gin site, it is positioned on a ramp or platform 70, having its unloading end adjacent to the ramp end 78 and substantially on one vertical plane therewith. A module carrier 18 has been positioned adjacent the platform 70, so as to receive the module 14 on the top surface 19 thereof. Once the truck 16 is in position above the track 110, the floor of the truck is put into motion, so that one end of the module 14 advances towards the unloading end of the truck and positions itself on the surface 19 of the carrier 18. Continuous movement of the bed causes the module 14 to further advance from the truck end, since one end of it rests on the surface 19, slightly move the carrier 18 away from the platform 70, until such time as the entire module 14 rests on the surface 19 of the carrier 18. The cotton modules can then be transported anywhere at a gin site, to the gin house 20, to the shed 140 or to other locations along the tracks 100 without the necessity to load or unload the carrier 18 prior to the final processing of the cotton module 14.

Many working hours are thereby saved, substantially reducing the cost of gin operation and allowing fast and efficient unloading of the trucks 16, which are needed for further transportation of cotton from the field to a gin.

At the same time, a tractor brings a trailer 22 to the gin site, positioning the trailer 22 adjacent the ramp 80, such that the wheels 23, that is the rear or unloading end of the trailer 22, is adjacent to the tracks 120. A cotton module carrier 18 has been positioned at the track 120 and ready for receiving of the cotton module 14 loaded thereon. By inclining the top surface of the trailer 22, the module 14 is allowed to slide downwardly, so that one end of the module 14 rests on the carrier, while the carrier 18 continues to move away from the trailer 22, due to the force applied by the module 14 onto the top surface 19. This continues until such time as the entire module 14 rests on the top surface 19 of the carrier 18. The cotton module 14 is now in a position to be transported with ease anywhere at the gin site with the help of the wheeled carrier 18.

When the turn comes, the carriers 18 are moved to the gin house 20, from which the cotton modules are unloaded in the conventional manner and delivered into the gin equipment, all the while utilizing the ability of the wheeled carrier 18 to easily transport heavy cotton bales from one location at the gin site to another, without requiring any substantial labor and all the while being elevated from the ground, thus keeping the cotton modules from moisture on the ground. If there is a danger of rain, the cotton modules resting on the carriers 18 are moved under the sheds 140 which can be one or more in number positioned above the tracks 100, thus temporarily protecting the cotton from being affected by rain. Since the season of cotton pick up is usually limited to about six weeks, the gin operation is substantially relieved from tension associated with the inability of the gin to process the delivered cotton immediately, once it has been delivered to a gin.

Figure 4:
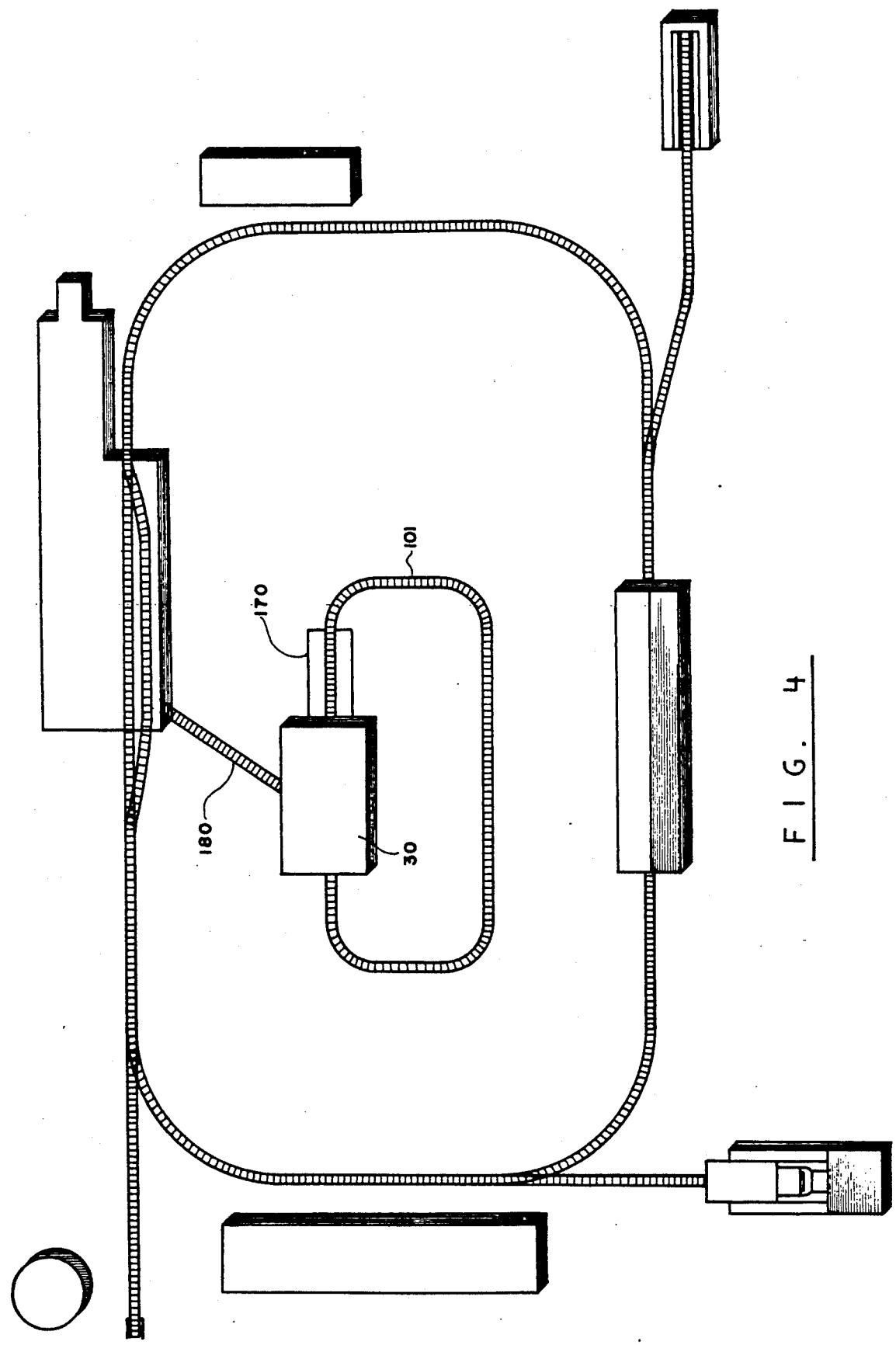
FIG. 4 illustrates a schematic view of a gin mill utilizing another embodiment of the system in accordance with the present invention, incorporating chain breakers and unloaders to handle cotton directly from the trucks for processing, to maintain a continuous flow of the trucks coming in and out of the facility at different locations.

As seen from FIG. 4, to further facilitate additional traffic and to allow a smoother, autonomous running of the operations, a second railway track system 101 can be placed running through building 30 which would allow additional trucks to run up and over ramp 170 for unloading onto carriers 18 on track 101. These carriers in turn will move along track 101 into building 30 where the cotton would be processed. That is to say, the cotton will be broken down by chain breakers and transported to the gin building 20 by conduit 180. This additional continuous movement and unloading mechanism will further reduce the number of operators necessary to work and process the cotton. This second loop railway system will allow a higher volume of trucks to pass through and unload their cargo. The chain breakers/cylinders used in this manner will also tend to speed up the processing of the cotton by eliminating steps involved.

Additional changes and modifications can be made in the system of the present invention without departing from the spirit thereof. I therefore pray that my rights to the present invention be limited only by the scope of the appended claims.

I claim:

1. An apparatus for conveying cotton modules, comprising:
    a network of railway tracks;
    means for supporting at least one cotton module comprising a carrier having a plurality of wheels adapted for movement along the railway tracks; and
    means for loading said cotton modules on said carrier, comprising a ramp for receiving a transportation means thereon, said ramp having a generally horizontally oriented unloading end elevated above at least a portion of said railway tracks to a vertical level slightly above the carrier positioned on the railway tracks, said elevated end being provided with an opening sized and shaped to removably receive a major part of said carrier under the same ramp with one end of said carrier extending outwardly from under said ramp prior to an unloading operation, so as to receive one end of said module thereon and slide outwardly from under said ramp as module gradually positions itself on the carrier during the unloading operation.

2. The apparatus of claim 1, further comprising a storage means having an elongated cover supported by a plurality of leg supports erected above at least a part of the railway track for temporary storing at least 1 carrier having a cotton module loaded thereon.

3. The apparatus of claim 1, wherein said loading means further comprises a second, inclined ramp for receiving a transportation means thereon positioned at least in part above a railway tack, so as to allow a carrier to be placed immediately adjacent to the ramp in end to end proximity to facilitate unloading of a cotton module, said second ramp having an unloading end positioned at a level slightly higher than a receiving end of said carrier.

4. The apparatus of claim 1, wherein said carrier has a flat, open bed adapted to receive the cotton module thereon.

5. The apparatus of claim 1, wherein a second network of railway tracks is added in a loop position to further facilitate and hasten the operations.

6. A method of conveying cotton modules, comprising the steps of:
    providing a network of railway tracks connecting at least one unloading station with a gin;
    providing a means for supporting and transporting the cotton module on the railway tracks, said supporting means comprising a carrier having a flat, open bed and a plurality of wheels adapted to run along the railway tracks;
    providing a means for loading said cotton modules on the carrier comprising a ramp for receiving a transportation means thereon, said ramp having a generally horizontally oriented unloading end positioned above at least a portion of the railway track at a vertical level slightly above the carrier mounted on the railway track, said unloading end being provided with an opening shaped and sized to removably receive a part of the carrier therein;
    positioning the transportation means on the ramp such that its unloading end is elevated above the unloading end of the ramp substantially one vertical plane;
    positioning the carrier on the tracks in such a manner that at least a portion thereof extends from under the ramp while a major part of the carrier is positioned under the ramp;
    placing one end of the module on the extending portion of the carrier;
    causing the module to move, gradually positioning itself on the carrier while causing the carrier to move along the track away from the ramp under the influence of a force applied by the module on the carrier; and
    moving the carrier along the railway track to a designated station.

7. The method of claim 6, a step for providing a storage means having an elongated cover supported by a plurality of leg supports directed above at least a part of the railway tracks for temporary storing at least one carrier having a cotton module loaded thereon.

8. The method of claim 6, wherein said loading means further comprises a second, included ramp for receiving a transportation means thereon positioned at least in part above a railway track, so as to allow a carrier to be placed immediately adjacent to the ramp in end to end proximity to facilitate unloading of the cotton module said second ramp having an unloading end positioned at a level slightly higher than the receiving end of carrier.

9. An apparatus for conveying cotton at a gin mill, comprising:
- a network of railway tracks connecting at least one unloading station with a gin and a storage station;
- means for supporting at least one cotton module comprising a carrier having a flat open bed supported by a plurality of wheels which are adapted for movement along the railway tracks;
- means for unloading said cotton module on said carrier comprising at least one ramp adapted for receiving a transportation means thereon, said ramp having a generally horizontally oriented unloading end elevated above at least a portion of said railway tracks and a means for limiting movement of the transportation means along the ramp in such a manner that when the transportation means is positioned on the ramp, its unloading end is substantially on the same vertical plane as an unloading elevated end of the ramp, said elevated end being provided with an opening sized and shaped to removably receive a major portion of said carrier therein, while allowing one end of said carrier to extend therefrom, so as to receive one end of said module therein and slide outwardly from under said ramp under the influence of a force supplied by the module which gradually positions itself on the carrier during the unloading operation; and
- a storage means having an elongated cover supported by a plurality of leg supports erected above at least a part of the railway tracks for temporary storing at least one carrier having a cotton module loaded thereon.

* * * * *